June 28, 1966  W. A. McGREGOR, JR  3,258,511
PROCESS FOR THE MANUFACTURE OF UPHOLSTERY
Filed Dec. 22, 1961
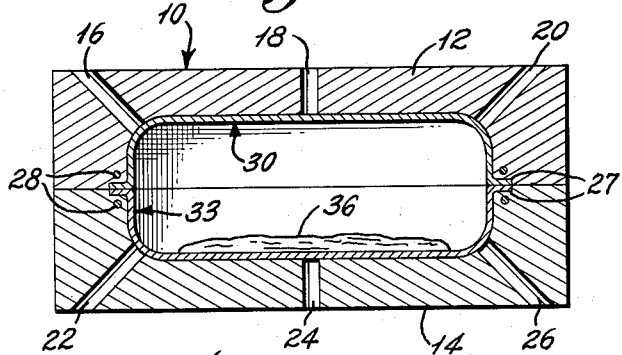
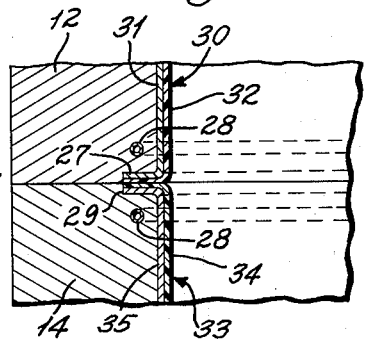
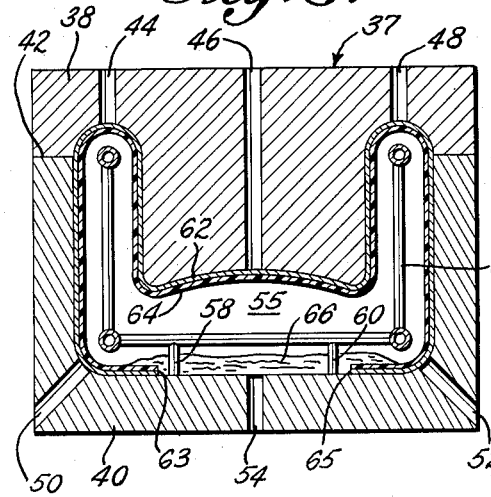
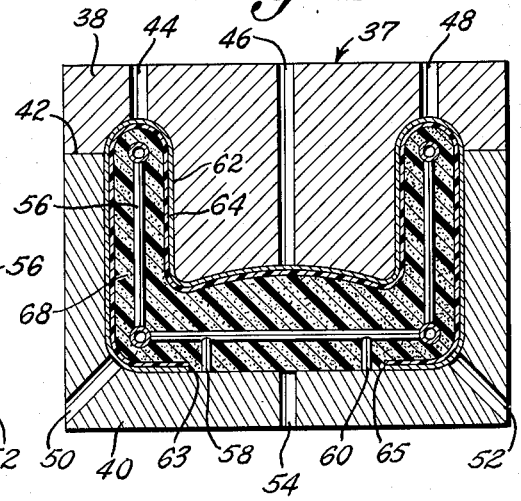
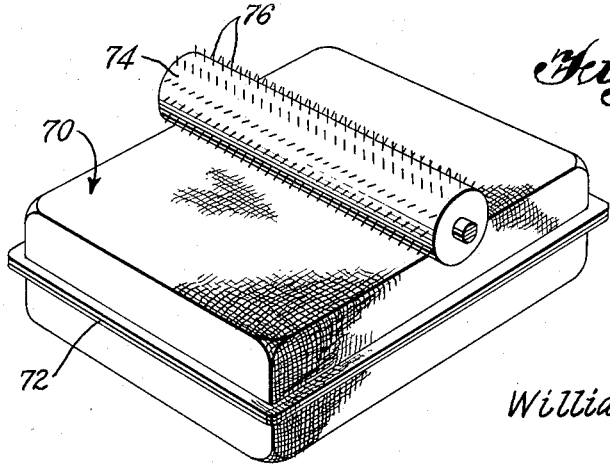
INVENTOR
William A. McGregor
BY Clelle W. [signature]
ATTORNEY

3,258,511
PROCESS FOR THE MANUFACTURE OF UPHOLSTERY

William A. McGregor, Jr., Pittsburgh, Pa., assignor to Mobay Chemical Company, Pittsburgh Pa. a corporation of Delaware
Filed Dec. 22, 1961, Ser. No. 161,549
7 Claims. (Cl. 264—45)

This invention relates generally to a process for the manufacture of upholstery and more particularly to a novel method for making foam cushions and other foam cushioned articles of manufacture while simultaneously covering the cushion or cushioned article with a woven fabric or similar fluid pervious cover.

Elastic polyurethane and other resin foams have proven to be advantageous for use as a cushioning material such as for seat cushions or for upholstering furniture and the like. It has been the general practice in the past to mold a large block of foam and to cut the block into smaller blocks of suitable size and shape. The cut blocks are then covered to make a pillow or the like or tacked or otherwise fastened to the frame of an article to be upholstered and covered with a fabric or other material. Typical methods of this type are disclosed, for example, in U.S. Patents 2,913,041 and 2,946,374. Such methods have the obvious disadvantage of requiring fabrication by hand. This disadvantage is partially overcome by the process disclosed in U.S. Patent 2,838,100 for molding a polyurethane foam about a frame to form the cushioning on an upholstered chair or the like. A fabric or other suitable pervious cover is not placed over the cushion, however, until after the foam has solidified and cured because the foamable polyurethane composition will enter the pores and spoil the appearance as well as the breathing characteristics of the cover. Such penetration of the fabric also occurs when using other synthetic resin foams.

It is therefore an object of this invention to provide a novel method for making a cushion or upholstered article of manufacture devoid of the foregoing disadvantages.

Another object of the invention is to provide a method for molding a foam cushion or the like.

A more specific object of the invention is to provide a method for molding a resin foam cushioned article of manufacture while simultaneously covering the cushion with a porous material.

Other objects will become apparent from the following description with reference to the accompanying drawing in which FIGURE 1 is a cross-sectional view of a mold apparatus suitable for making a covered cushion in accordance with one embodiment of the invention;

FIGURE 2 is a similar sectional view showing the left-hand side of FIGURE 1 on an enlarged scale;

FIGURE 3 is a cross-sectional view of a mold apparatus suitable in the manufacture of a cushioned chair in accordance with a futher embodiment of this invention;

FIGURE 4 is a sectional view similar to FIGURE 3 showing the mold in a later stage of a process of making said cushioned chair; and FIGURE 5 is a perspective view of a covered cushion as prepared by the mold of FIGURE 1 being subjected to a further step in a preferred embodiment of the invention.

Generally speaking, the objects of this invention are accomplished by providing a method for molding a synthetic resin foam cushion having a fabric or similar porous covering wherein a suitable mold is lined with a fabric or similar porous material, an impervious film is provided to cover the side of the fabric or the like normally exposed to the mold cavity and sufficient liquid foamable resin composition is foamed in the mold cavity to completely fill the cavity and press against the exposed surface of the impervious film. The impervious film lying between the fabric or other porous cover and the liquid foamable resin composition prevents penetration of the pores by the liquid or resulting solidified resin foam. In a preferred embodiment of the invention, the impervious film is punctured or otherwise rendered fluid pervious after the foam has solidified. The fabric or similar cover and impervious film can be shaped to the contour of the mold cavity by any suitable means such as by hand if desired, but it is preferred to use a vacuum mold and to shape the cover and film by applying a vacuum to the mold prior to filling the cavity with foam.

In its broadest aspects, the invention contemplates the use of any fluid impervious sheet-like material either as a separate sheet or as a lamina of the cover. However, best results are obtained if the impervious layer is secured to the porous cover, so it is preferred to use covering material having the film laminated thereto. The impervious film can be of any thickness in so long as penetration of the pores of the cover by the foamable composition is prevented thereby. Ordinarily, it is preferred that the film have a thickness of from about 0.0001 in. to about 0.1 in. The film can be one which has been formed as a self-supporting film or sheet and then secured to the fabric or other porous materials used as the cover, or it can be laminated to the fabric as a coating thereon if care is taken to avoid penetration of the pores of the fabric by the coating to the point where the appearance thereof is deleteriously effected. In most instances it is advantageous to use a self-supporting film and to adhesively bind this film to the underside of the fabric or other covering material.

Any suitable film can be used as the impervious layer such as, for example, non-porous polyurethane or those prepared from cellulose ethers and esters, e.g., methyl cellulose, ethyl cellulose, cellulose nitrate, cellulose acetate, cellulose butyrate, cellulose acetatebutyrate; homopolymers and interpolymers derived from monomers containing the vinylidene $CH_2=C<$ group such as vinyl halides, e.g., vinyl chloride, vinyl bromide; vinylidene chloride; olefins, e.g., ethylene, isobutylene; vinyl esters of carboxylic acids, e.g., vinyl acetate, vinyl propionate, vinyl benzoate; vinyl esters, e.g., vinyl methyl ether, vinyl isobutyl ether; unsaturated carboxylic acids and derivatives thereof, e.g., acrylic acid, acrylic acid esters, acrylamide, acrylonitrile, methacrylic acid and its corresponding derivatives; vinyl aromatic compounds, e.g., styrene, vinyl tolurene, alpha-methylstyrene, o-chlorostyrene, 2,5-dichlorostyrene, 2,4-dimethylstyrene; and interpolymers of such vinylidene monomers with alpha, beta-unsaturated polycarboxylic acids and derivatives thereof, e.g., maleic anhydride, diethyl maleate, dibutyl fumarate, and diallyl maleate.

The thermoplastic sheets employed also may be fabricated from blends of two or more polymeric materials, e.g., blends of polyvinyl chloride and butadiene-acrylonitrile interpolymers, blends of polystyrene with rubbery diene polymers such as natural rubber, butadiene-styrene interpolymers and butadiene-acrylonitrile interpolymers, etc. or high impact polystyrene prepared by polymerizing monomeric styrene in the presence of rubbery diene polymers. In all cases, the film must be impervious and substantially insoluble in the foamable resin composition used to form the cushion or cushioned article.

Any suitable adhesive such as a rubber-based adhesive or a polyurethane based adhesive can be used to laminate the film to the fabric, or the like. Other means for securing the film to the fabric can be used such as, for example, by sewing the two together, stapling, or the like.

Essentially any foamable thermosetting or thermoplastic resin composition can be employed in the practice of this invention to form the cushion or cushioned article. Such foamable resin compositions consist of a predominant proportion of resin and a small proportion of a blowing, foaming or pore forming agent. Examples of foamable resins that may be employed include thermosetting resins such as the phenolaldehyde types, the urea-aldehyde types, the melamine-aldehyde types and thermoplastic resins such as cellulose ethers and esters, e.g., methyl cellulose, ethyl cellulose, cellulose acetate; homopolymers and interpolymers derived from monomers containing the vinylidene group $CH_2=C<$ such as the vinyl chloride, vinyl bromide; vinylidene chloride; olefins, e.g., ethylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, acrylic acid esters, acrylamide, acrylonitrile, methacrylic acid and its corresponding derivatives; vinyl aromatic compounds, e.g., styrene vinyl toluene, alpha-methylstyrene, o-chlorostyrene, 2,5-dichlorostyrene and interpolymers of such vinylidene monomers with alpha, beta-unsaturated polycarboxylic acids and their derivatives, e.g., maleic anhydride, diethyl maleate, dibutyl fumarate, diallyl maleate, etc.

Liquid foamable polyurethane compositions are the preferred resins for use in the practice of the present invention. Preferably, the polyurethane composition will contain an organic polyisocyanate, a polyalkylene ether polyhydric alcohol, water and a gas such as carbon dioxide and a chloro-fluorohydrocarbon such as dichloro-fluromethane, trichloro-fluro-methane and the like. Suitable foamable polyurethane compositions for use in this invention are disclosed in the art such as, for example, in U.S. Patent Re. 24,514, U.S. Patent 2,948,691, and U.S. Patent 2,949,431, the disclosures of which are incorporated herein by reference thereto. Since the invention is not concerned with the preparation of the foam or its chemical composition reference may be made to these patents when preparing foam for use in this invention.

Suitable foaming or blowing agents for the foamable resin compositions are well known in the art and the selection of the particular foaming or blowing agent to be employed will be dictated largely by the particular resin in which it is to be incorporated. In some cases the foaming agent may be generated in situ, as for example in the preparation of polyurethane foams by reacting polyesters with polyisocyanates.

When using polyurethane compositions which do not generate the foaming agent in situ, numerous known blowing agents may be incorporated with the composition, e.g., the chloro-fluro carbons mentioned above.

The cover for the foam cushion or cushioned article can be any suitable covering material ordinarily used in upholstering furniture and covering ornamental pillows and the like, such as woven woolen fabrics, woven nylon fabrics, or fabrics woven from other various synthetic fibers as well as such materials as leather and the like.

Referring now to the drawing and more particularly to FIGURES 1 and 2 thereof, there is illustrated means for carrying out the process of this invention as applied to the preparation of a foam cushion or pillow. Reference numeral 10 denotes a split mold made up of an upper and lower half indicated respectively by numerals 12 and 14. Passing through the body of the mold are six vacuum conduits denoted by numerals 16, 18, 20, 22, 24 and 26 which are attached to vacuum means not shown. Reference numeral 27 denotes a groove formed within the inner portion of the mold body at the joint line where the upper and lower members of the mold meet. Surrounding this groove are heating elements 28 connected to electrical heating means not shown.

Reference numeral 30 denotes a blank of cover material made up of a porous fabric sheet 31 having laminated thereto an impervious plastic sheet 32, positioned in the upper half of the mold body while an identical cover blank denoted by reference numeral 33 is positioned in the lower half of the mold body. This second blank is made of a plastic impervious film 34 laminated against fabric sheet 35.

The individual laminae of the cover blank are best shown in FIGURE 2. Reference numeral 29 denotes the edges of the laminated blanks 30 and 33 positioned within groove 27 which will form a seam when heat sealed. Reference numeral 36 denotes a mass of foamable resin composition.

In forming a pillow in accordance with this embodiment of the invention utilizing the apparatus illustrated in FIGURES 1 and 2, each of the two halves 12 and 14 of the mold 10 are lined with a pre-cut blank of cover material 30 and 33. Plastic film sheets 32 and 34, previously laminated to the fabric sheets 31 and 35, face the mold opening. With the laminated sheets loosely contoured against the mold cavity the mold is opened and the foamable resin mass 36 is placed in the bottom half of the mold after which the two halves of the mold are joined and a vacuum drawn through vacuum conduits 16, 18, 20, 22, 24 and 26 whereby the laminated sheet closely adheres to the contour of the mold cavity. The foamable resin composition expands and fills the mold cavity pressing against the inner plastic sheets, but not exuding therethrough. During foaming, or if desired after foaming, heating elements 28 are actuated to heat seal adjacent plastic sheets 32 and 34 within groove 27 together. Heating is then discontinued and the mold opened to permit removal of the foamed pillow having substantially the configuration disclosed in FIGURE 5.

The process of this invention as applied to the upholstering of a chair is illustrated by FIGURES 3 and 4. In these figures of the drawing reference numeral 37 indicates a split mold made up of upper and lower halves indicated by reference numerals 38 and 40, respectively, which are shown to meet along joint line 42. Vacuum conduits are again provided being indicated by reference numerals 44, 46, 48, 50 and 52. Reference numeral 54 denotes a port for introducing the foamable resin composition. Within the mold cavity 55 there is positioned a metal chair frame indicated by reference numeral 56 and supported within the cavity by pins 58 and 60. Lining a major portion of the mold cavity 55 is a porous fabric sheet 62 having laminated thereto an impervious plastic sheet 64, which sheets are shown to terminate at points 63 and 65 at the bottom of the mold cavity, thus permitting feeding of a foamable resin mass 66 through port 54.

In upholstering a chair in this embodiment of the invention the fabric sheet 62 and plastic impervious sheet 64 are vacuum formed to closely adhere to the contour of the mold cavity 55. The foamable resin mass 66 is then charged into the mold cavity through port 54 and permitted to foam in place, thus forming the foamed resin indicated by reference numeral 68 in FIGURE 5 of the drawing. It will be noted that in this embodiment of the invention the resin foam and plastic sheet should be so chosen so as to form a strong bond between each other in order for the laminated sheet to adhere particularly at its ends terminating at points 63 and 65.

After the foam has hardened, the mold is opened and the molded chair removed for attachment thereto of chair legs in any convenient manner to the frame 56.

Depending upon the article being upholstered or the desire of the manufacturer, the plastic sheet and foamed resin may or may not adhere to each other. When producing a foam pillow in the manner illustrated by FIGURES 1 and 2 the plastic sheet and resin foam will ordinarily be so chosen that no adhesion occurs between the two, while with the upholstering process illustrated by FIGURES 3 and 4 it will be necessary to obtain adhesion for best results. Where the thermoplastic sheet and the foamed resin employed are based upon the same resin, a strong physical bond is usually obtained without the use of adhesives. Alternatively, the plastic sheet laminated against the fabric can be heated within the mold to cause adhesion to the resin foam, although a suitable laminate may also be prepared according to the process of my copending application Serial No. 224,665, filed September 19, 1962.

In some instances it is desirable that a cushion or upholstered article be fluid pervious in order that it will breathe. This can be achieved by a further embodiment of the present invention illustrated in FIGURE 5. In FIGURE 5 reference numeral 70 denotes a covered foam cushion produced by means of the process described in connection with FIGURES 1 and 2. Reference numeral 72 denotes the bead formed by the heat sealing of the plastic sheets 32 and 34. Reference numeral 74 denotes a roller having needle-like projections 76. In this embodiment of the invention roller 74 is rolled across the surface of cushion 70 in order to puncture the impervious film laminated or otherwise attached to the fabric cover. Of course, the puncturing of the impervious sheet or film can also be accomplished by other means, as for example, by hand.

In those embodiments where the impervious film is not punctured, breathing characteristics can be imparted to the cushions or other upholstered articles by inserting a perforated plate or porous panel in one or more sides of the upholstered article. For example, after molding a cushion of the type shown in FIGURE 5, a small section can be cut from the side thereof and a perforated brass disc can be sewn in place. Air can pass through the perforated disc into or from the cushion as it is compressed or pressure thereon in released. It might be advisable to remove a partial or entire side of the cushion cover after it is formed and to replace the impervious film with a gas pervious panel such as one made from cloth.

Obviously, many modifications and variations of the present invention are possible in light of the above teachings. It is therefore to be understood that within the scope of the appended claims, the invention may be practiced otherwise than as specifically described.

What is claimed is:

1. A process for making an upholstered article of manufacture having a porous cover which will breathe and having a foamed plastic core which does not extend into the pores of the cover, said process comprising foaming a liquid foamable mixture in a mold containing as a lining the said cover while maintaining between the said cover and the foamable mixture a liquid impervious layer which prevents the liquid foamable mixture from entering the pores in the cover and thereafter puncturing the said impervious layer.

2. The process of claic 1 wherein the foamable mixture forms a polyurethane foam in the mold.

3. A process of upholstering an article of manufacture with a porous upholstery cover which comprises placing the porous upholstery cover in a mold with a fluid impervious sheet separating the said upholstery cover from the mold cavity, foaming within the resulting lined cavity a foamable liquid resin, whereby said impervious sheet prevents the foamable resin from entering the pores in the upholstery cover, and thereafter puncturing the impervious sheet to permit breathing of the resulting article.

4. The process of claim 3 wherein the foamable resin reacts to form a polyurethane foam.

5. A process for manufacturing a foam cushion pillow which comprises lining each part of a mold with a porous sheet and a thermoplastic, fluid impervious sheet, said impervious sheet facing the mold cavity, foaming within said lined cavity a foamable resin, said lining sheets disposed to extend beyond the edges of the mold cavity when the foamable resin has completely filled said mold cavity, said lining sheets being joined where the parts of the mold meet and being sealed by the application of heat at that juncture, and thereafter puncturing said impervious sheet at a multiplicity of points to permit breathing of said pillow.

6. A process of manufacturing a covered foam cushion comprising lining each part of a split mold with a sheet of porous material, and a sheet of thermoplastic fluid impervious material, said sheet of impervious material facing the mold cavity, said sheets extending beyond the area of the mold cavity, foaming a synthetic resin in said mold cavity to expand the same against said sheets, heat sealing together the portion of the thermoplastic sheets which extend beyond the area of the mold cavity and thereafter piercing the resulting cushion at a plurality of points to puncture said thermoplastic sheets.

7. A process of manufacturing a covered foam cushioned article comprising lining a mold with a porous sheet and a thermoplastic impervious sheet, said impervious sheet facing the mold cavity, supporting a frame of the article within said cavity and foaming a foamable resin within said lined cavity to expand the same about said frame and against said impervious sheet, and thereafter piercing the article at a plurality of points to puncture said impervious sheet.

References Cited by the Examiner
UNITED STATES PATENTS

| | | | |
|---|---|---|---|
| 1,586,076 | 5/1926 | Dickey | 264—156 |
| 2,255,555 | 9/1941 | Gordon | 5—381 XR |
| 2,289,177 | 7/1942 | Chandler | 264—156 |
| 2,394,122 | 2/1946 | Urmston. | |
| 2,619,659 | 12/1952 | Futterknecht | 5—361 |
| 2,620,494 | 12/1952 | Kay | 5—354 |
| 2,633,441 | 3/1953 | Buttress | 264—156 XR |
| 2,648,619 | 8/1953 | Alderfer | 264—47 XR |
| 2,753,599 | 7/1956 | Pietraszek et al. | 264—45 |
| 2,753,642 | 7/1956 | Sullivan | 264—45 XR |
| 2,802,766 | 8/1957 | Leverenz. | |
| 2,831,532 | 4/1958 | Kasper | 5—361 |
| 2,838,100 | 6/1958 | Follows | 297—452 |
| 2,924,863 | 2/1960 | Chavannes. | |
| 2,955,972 | 10/1960 | Wintermute et al. | 264—45 XR |
| 2,963,715 | 12/1960 | Young. | |
| 2,976,577 | 3/1961 | Gould | 264—45 |
| 2,994,617 | 8/1961 | Proctor | 264—156 XR |
| 3,008,859 | 11/1961 | Smack | 264—45 |
| 3,080,267 | 3/1963 | Schmaly | 264—45 XR |
| 3,088,539 | 5/1963 | Mathues et al. | 264—45 XR |
| 3,091,946 | 6/1963 | Kesling | 264—45 XR |
| 3,108,852 | 10/1963 | Olsen | 264—46 |

FOREIGN PATENTS

| | | |
|---|---|---|
| 213,094 | 2/1958 | Australia. |
| 873,518 | 7/1961 | Great Britain. |

ALEXANDER H. BRODMERKEL, Primary Examiner.

FRANK B. SHERRY, ALFRED L. LEAVITT,
Examiners.

A. M. CALVERT, P. E. ANDERSON,
Essistant Examiners.